(12) United States Patent
Smith et al.

(10) Patent No.: US 9,316,514 B2
(45) Date of Patent: Apr. 19, 2016

(54) HIGH PRESSURE WAFER STYLE MAGNETIC FLOWMETER

(71) Applicant: Rosemount Inc., Chanhassen, MN (US)

(72) Inventors: Joseph Alan Smith, Minneapolis, MN (US); Steven Bruce Rogers, Minnetonka, MN (US); Jesse Christopher Pettit, Minneapolis, MN (US); Nelson Mauricio Morales, Lakeville, MN (US)

(73) Assignee: ROSEMOUNT INC., Chanhassen, MN (US)

( * ) Notice: Subject to any disclaimer, the term of this patent is extended or adjusted under 35 U.S.C. 154(b) by 106 days.

(21) Appl. No.: 14/226,327

(22) Filed: Mar. 26, 2014

(65) Prior Publication Data

US 2015/0276444 A1    Oct. 1, 2015

(51) Int. Cl.
*G01F 1/58* (2006.01)
(52) U.S. Cl.
CPC ........ *G01F 1/584* (2013.01); *G01F 1/58* (2013.01); *G01F 1/586* (2013.01)
(58) Field of Classification Search
None
See application file for complete search history.

(56) References Cited

U.S. PATENT DOCUMENTS

| 4,065,965 | A |   | 1/1978 | Ackerman et al. |          |
|-----------|---|---|--------|-----------------|----------|
| 4,722,231 | A | * | 2/1988 | Tanaka          | G01F 1/58 73/861.12 |
| 5,398,553 | A | * | 3/1995 | Hemp            | G01F 1/58 73/861.12 |
| 5,773,723 | A | * | 6/1998 | Lewis           | G01F 1/58 73/861.12 |
| 2005/0183514 | A1 | * | 8/2005 | Huybrechts | G01F 15/006 73/861.12 |
| 2005/0193833 | A1 | * | 9/2005 | Huybrechts | G01F 1/588 73/861.12 |
| 2008/0022781 | A1 | * | 1/2008 | Huybrechts | G01F 1/58 73/861.12 |
| 2009/0188327 | A1 |   | 7/2009 | Shanahan et al. | |
| 2010/0294043 | A1 | * | 11/2010 | Magliocca | G01F 1/588 73/861.11 |
| 2013/0305838 | A1 | * | 11/2013 | Mikolichek | G01F 1/58 73/861.08 |
| 2014/0083199 | A1 | * | 3/2014 | Rogers | G01F 1/584 73/861.12 |
| 2014/0090483 | A1 | * | 4/2014 | Smith | G01F 1/588 73/861.11 |

FOREIGN PATENT DOCUMENTS

WO    WO 2013003021 A1    1/2013

OTHER PUBLICATIONS

"Rosemount 8700 Series Magnetic Flowmeter Sensors", Quick Installation Guide, Jan. 2013, Rosemount, Emerson Process Management, 42 pages.
International Search Report and Written Opinion for International Application No. PCT/US2015/021763, date of mailing: Jun. 29, 2015, date of filing: Mar. 20, 2015, 14 pages.

\* cited by examiner

*Primary Examiner* — Harshad R Patel
(74) *Attorney, Agent, or Firm* — Christopher R. Christenson; Kelly, Holt & Christenson, PLLC

(57) ABSTRACT

A wafer-type electromagnetic flow sensor includes a single-piece chassis having a pair of faces and a flow conduit extending between the pair of faces. Each face of the chasses includes a feature configured to engage a metal sealing ring. A non-conductive liner is disposed in the flow conduit of the single-piece chassis. A plurality of electromagnetic coils is configured to generate a flux into process fluid flowing through the flow conduit. A pair of electrodes is configured to electrically couple to the process fluid. A feedthrough assembly is configured to maintain process fluid pressure while allowing a plurality of electrical conductors to pass therethrough.

17 Claims, 3 Drawing Sheets

HIGH PRESSURE WAFER STYLE MAGNETIC FLOWMETER

BACKGROUND

Industrial process control systems are used to monitor and control industrial processes which produce or transfer liquids or the like. In such systems, it is typically important to measure "process variables" such as temperatures, pressures, flow rates, and others. Process control transmitters are used to measure such process variables and transmit information related to the measured process variable back to a central location such as a central control room.

One type of process variable transmitter is a magnetic flowmeter (or mag meter). Magnetic flowmeters measure flow by using Faraday induction, which is an electromagnetic effect. The magnetic flowmeter includes a coil that is energized to generate a magnetic field across a section of a flow conduit, such as a pipe. The magnetic field induces an electromotive force (emf) in the process fluid flow. The induced voltage drop across the process fluid flow is related to the flow velocity, which is proportional to the volumetric flow rate and the cross sectional area of the flow conduit. The voltage drop is generally measured with electrodes that couple to the process fluid, either directly or via capacitive coupling.

Electromagnetic flow measurement techniques are generally applicable to ionic solutions, water-based fluids and other conducting fluids. Illustrative environments where magnetic flowmeters are employed include: hygienic food and beverage production, water treatment facilities, high-purity pharmaceutical manufacturing, and chemical processing, including hazardous and corrosive process fluid flows. Additionally, mag meters are also employed in the hydrocarbon fuel industry, including hydrocarbon extraction and processing as well as hydraulic fracturing techniques utilizing abrasive and corrosive slurries.

Magnetic flowmeters provide fast and accurate flow measurements in applications where other flow measurement techniques, which introduce a flow measurement element (such as an orifice plate) into the process fluid flow, are not suitable. One of the significant costs in the manufacture of the magnetic flowmeter is the flowtube through which the process fluid flows. This flowtube must bear the process fluid pressure and must not introduce leaks into the process. Typically, the flowtube includes a pair of flanges that bolt to pipe flanges to create a robust process fluid connection. However, in some environments, the added cost of the flanged flowtube may be cost prohibitive. In such instances, a flangeless, or wafer-type magnetic flowmeter is used. The wafer-type magnetic flowmeter includes a flowtube without any flanges. Thus, a wafer-type magnetic flowmeter can be more economical, compact and lightweight than traditional flanged magnetic flowmeters. One example of a commercially available wafer-type magnetic flow sensor is sold under the trade designation Model 8711 Wafer Sensor, available from Emerson Process Management. When a magnetic wafer sensor is paired with suitable transmitter electronics, such as those sold under trade designations, Model 8732E, Model 8712E, or 8712H, a fully operational wafer-type magnetic flowmeter is provided.

SUMMARY

A wafer-type electromagnetic flow sensor includes a single-piece chassis having a pair of faces and a flow conduit extending between the pair of faces. Each face of the chassis includes a feature configured to engage a metal sealing ring. A non-conductive liner is disposed in the flow conduit of the single-piece chassis. A plurality of electromagnetic coils is configured to generate a flux into process fluid flowing through the flow conduit. A pair of electrodes is configured to electrically couple to the process fluid. A feedthrough assembly is configured to maintain process fluid pressure while allowing a plurality of electrical conductors to pass therethrough.

DETAILED DESCRIPTION OF ILLUSTRATIVE EMBODIMENTS

While wafer-type electromagnetic flow sensors offer a number of advantages over traditional flanged electromagnetic flow sensors, their application in high pressure applications has been limited. The ASME B16.5-1996 Pipe Flanges and Flange Fittings standard covers pressure-temperature ratings, materials, dimensions, tolerances, marking, testing, and methods of designating openings for pipe flanges and flanged fittings. Compliance with this standard is important in many contexts to ensure reliable, robust and safe pipe connections. Since a wafer-type electromagnetic flow sensor does not have flanges, it can be at a disadvantage for containing process fluid pressure. For example, the Model 8711 listed above has an ASME rating of class 300. However, applications in oil and gas (specifically, water injection and water separation) are routinely in the 1"-8" diameter line size and in the class 600-class 2500 range. Thus, for such high pressure applications, a flanged magnetic flow sensor may be the only option available to handle the required pressure. The limitations of flanged magnetic flow sensors are mainly size and cost. While a range of flanged magnetic flowmeter sensors are available to meet high pressure requirements, these models are some of the largest to produce, in terms of meter weight, lay length and cost. The amount of material in the flowtubes of such flanged magnetic flowmeter sensors results in a high price as well as logistical challenges once the flowmeter is on-site.

Measuring flow under high pressure is becoming increasingly common across many industries. Thus, it is important to provide a cost effective way to measure and/or record process fluid flow while containing pressures up to ASME class 2500. Providing a magnetic flowmeter that can operate at pressures as high as ASME class 2500 without the costs of a flanged design would provide important advantages to high pressure process fluid flow measurement applications.

Figure 1:
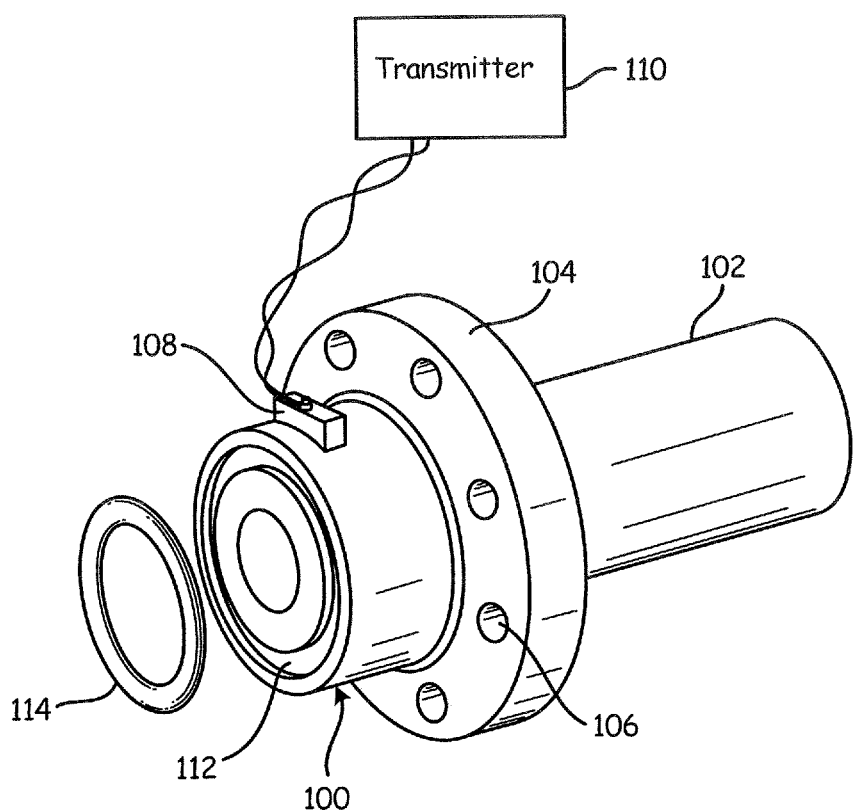
FIG. 1 is a diagrammatic view of a wafer-type electromagnetic flow sensor mounted to a process fluid conduit in accordance with an embodiment of the present invention.

FIG. 1 is a diagrammatic view of a wafer type electromagnetic flow sensor mounted to a process fluid conduit in accordance with an embodiment of the present invention. Flow sensor 100 is mounted to pipe 102. For clarity, only one side of the pipe mount is shown. Pipe 102 includes a pipe flange 104 with a number of bolt holes 106 therethrough. Bolt holes in pipe flange 106 are aligned with bolt holes in a cooperative pipe flange (not shown) such that bolts can be used to essentially clamp wafer-style flow sensor 100 between the pipe flanges. Sensor 100 includes a high-pressure electrical feedthrough or header 108 assembly that allows electrical connection between transmitter 110 and coils/electrodes within sensor 100 (not shown in FIG. 1). In accordance with an embodiment of the present invention, sensor 100 is formed of a single-piece metallic chassis having a feature each flange-facing surface that is configured to engage a metal sealing ring. In one embodiment, the feature is a groove 112 on each flange-facing surface. However, embodiments of the present invention can be practiced with various geometries of both the surface features and the metallic sealing rings as long as suitable cooperative engagement is provided to generate a robust seal. Suitable examples of surface features include flat face and raised face connections.

A metal-to-metal seal is created by engaging a metallic ring 114 with a respective surface feature, such as groove 112. The metallic ring/groove configuration can be a ring-type joint (RTJ) connection, or any other suitable metal-to-metal coupling. The metal-to-metal coupling extends from the sensor chassis, proximate the groove, to the metallic ring, and to the pipe flange, which may also have a suitable groove to accept the metallic ring. As the pipe flanges are drawn together by the bolts, the metallic ring is deformed to create a high integrity seal. It is believed that the combination of a single-piece chassis with metal-to-metal seals to the pipe flanges provides an exceptionally robust, high integrity system that will meet pressure/temperature standards as high as ASME class 2500.

Figure 2:
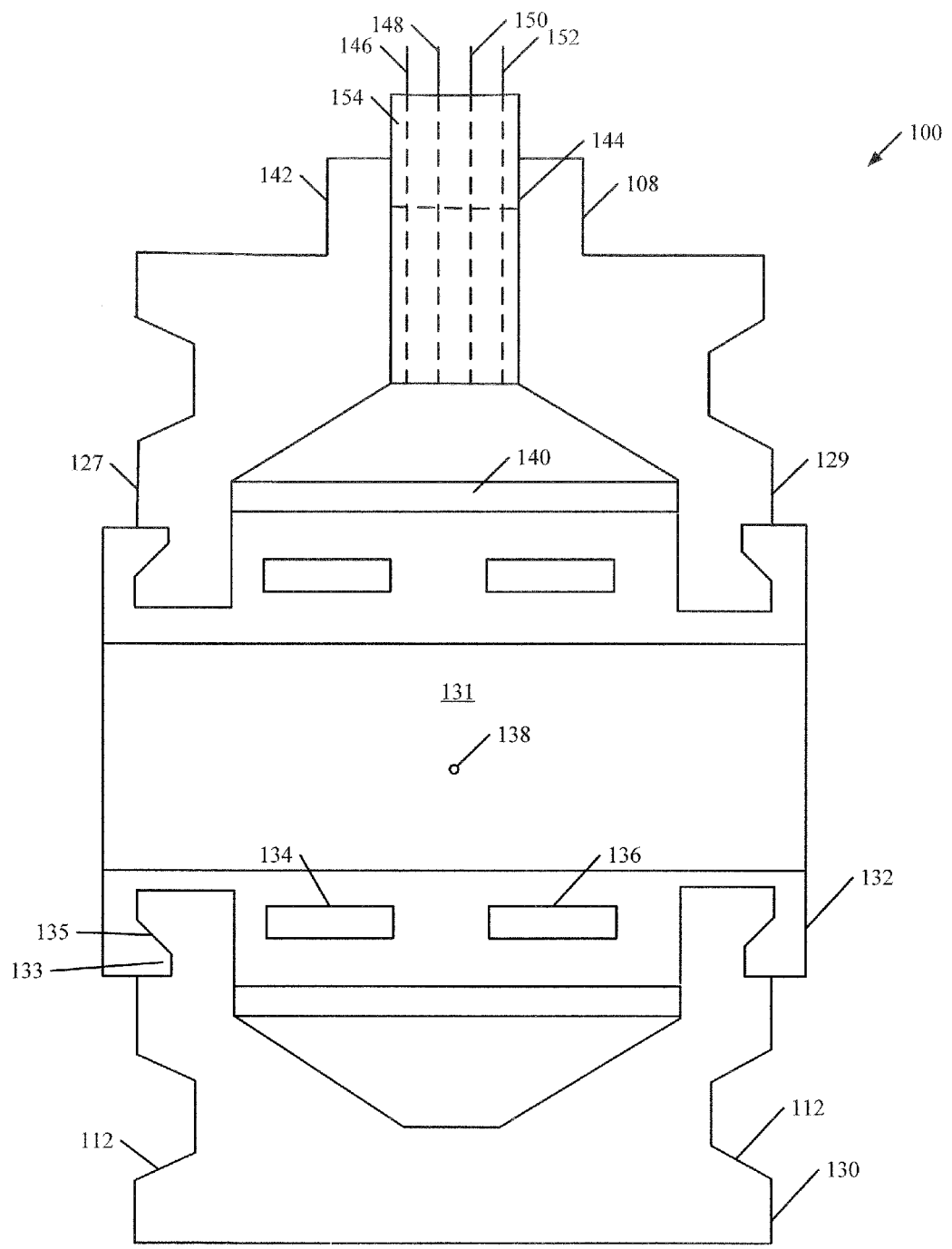
FIG. 2 is a diagrammatic cross sectional view of an electromagnetic flow sensor in accordance with an embodiment of the present invention.

FIG. 2 is a diagrammatic cross sectional view of an electromagnetic flow sensor in accordance with an embodiment of the present invention. Flow sensor 100 includes chassis 130 that is formed as a single piece. Chassis 130 has a pair of faces 127, 129 and a flow conduit 131 extending between the pair of faces 127, 129. Chassis 130 can be formed using any suitable techniques, but in one embodiment is cast as a single piece of carbon steel. Chassis 130 also includes grooves 112 on faces 127, 129 to receive metallic rings 114. In one embodiment, grooves 112 have tapered sides and a flat bottom, to form partial v-shaped grooves. This shape cooperates particularly well with metal sealing rings that have a circular cross-section, which causes a single, high pressure metal-to-metal contact point on each of the tapered sides.

An electrically insulating liner 132 is provided at an inside diameter of chassis 130. Liner 132 ensures that the conductive process fluid does not contact chassis 130 as the process fluid flows therethrough. Liner 132 can be formed of any suitable non-conductive material. Suitable materials for such molding-in-place techniques include plastics and urethanes such as Polyurethane and Adiprene. However, embodiments of the present invention can be practiced with any suitable non-conductive material forming liner 132. Liner 132, in one embodiment, includes a feature 133 that engages a groove or dovetail channel 135 in chassis 130 to better adhere liner 132 to chassis 130. While non-conductive liner 132 can be placed within conduit 131 in any suitable manner, in one embodiment, liner 132 is molded in place within conduit 131 of chassis 130.

In one embodiment, the coils 134, 136 and/or electrodes 138 (only one of which is shown in FIG. 2) can be molded into liner 132. Coils 134, 136 can be formed in any suitable manner. However, in one embodiment, coils 134, 136 are bobbin-wound coils that are embedded in liner 132. Additionally, given the high pressures involved, at least some embodiments include a tortuous electrode path for electrodes 138, such that pressure acting against the electrode itself may not expel the electrode or otherwise damage the flow sensor. Thus, a flexible circuit or other suitable conductor(s) may be embedded within liner 132 to make suitable electrical connections to electrodes 138.

In one embodiment, an electrical steel ring 140 is employed to direct magnetic flux to the process, and thus shield the conductors and header 108. While electrical steel is employed in the illustrated embodiment, ring 140 can be any suitable material that can direct the magnetic flux as required.

FIG. 2 illustrates feedthrough assembly 108 as including a raised portion 142 in chassis 130 having a bore or aperture 144 therethrough. A number of conductors 146, 148, 150 and 152 are coupled to respective coils and electrodes. Conductors 146, 148, 150 and 152 pass through header 154. Header 154 may be a ceramic off-the-shelf electrode or glassed-in header welded to chassis 130 at the outside diameter of chassis 130. This helps ensure that feedthrough assembly 108 would block the only potential leak path, thereby ensuring that no process fluid leaks into the atmosphere if the meter should fail. In one embodiment, feedthrough assembly 108 is sized and shaped to resemble a standard tube adapter such that a standard transmitter can be mounted to feedthrough assembly 108.

Figure 3:
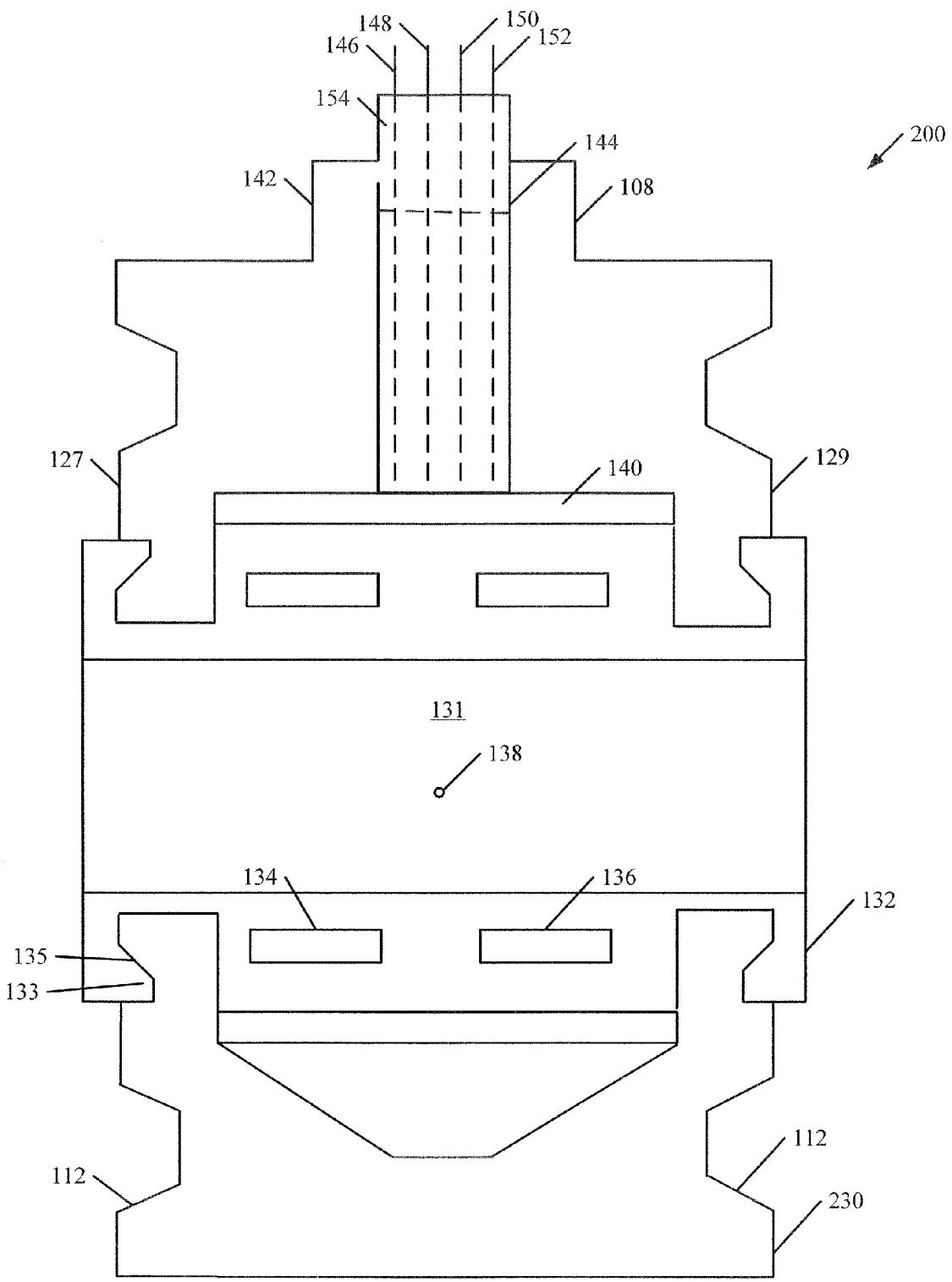
FIG. 3 is a diagrammatic cross sectional view of an electromagnetic flow sensor in accordance with another embodiment of the present invention.

FIG. 3 is a diagrammatic cross sectional view of an electromagnetic flow sensor in accordance with an embodiment of the present invention. Sensor 200 bears many similarities to sensor 100, and like components are numbered similarly. The main difference between sensor 200 and sensor 100 is that sensor 200 does not include a taper extending from electrical steel ring 140 to aperture 144. By removing the taper, it is believed that the embodiment illustrated in FIG. 3 can achieve compliance with higher pressure/temperature classes. For example, while the embodiment illustrated in FIG. 2 is expected to achieve ASME class 900 compliance, the embodiment illustrated in FIG. 3 is expected to achieve ASME class 2500 compliance.

Embodiments of the present invention provide a number of advantages over existing designs. For example, if a magnetic flowmeter that achieves ASME class 900 is required for a 4" diameter pipe, a flanged magnetic flow sensor will weigh approximately 140 pounds. In contrast, embodiments of the present invention can provide a wafer-type electromagnetic flow sensor that weighs only 32 pounds and still achieves ASME class 900 compliance. Furthermore, the wafer-type flow sensor has a reduced lay length, in comparison to the flanged design, of 75 percent. This significant material savings translates directly into saved material costs. For example, it is believed that the material savings for the example provided above are on the order of 70% for the flowtube alone. Moreover, it also believed that labor costs will be reduced as less welding is required for embodiments of the present invention, in comparison to flanged designs.

Embodiments of the present invention also provide performance advantages over flanged designs. Specifically, redundancy in pressure retention is made possible by the chassis design of the wafer-type electromagnetic flow sensor. This is particularly important for mag meters operating at such high pressures since the most important function of the mag-meter is simply containing the high process fluid pressure in addition to measuring flow at such high pressures.

Although the present invention has been described with reference to preferred embodiments, workers skilled in the art will recognize that changes may be made in form and detail without departing from the spirit and scope of the invention.

What is claimed is:

1. A wafer-type electromagnetic flow sensor comprising:
   a single-piece chassis having a pair of faces, a flow conduit extending between the pair of faces, wherein each face includes a feature configured to engage a metal sealing ring, and a single aperture of the single-piece chassis extending from the flow conduit to an outside diameter;

a non-conductive liner disposed in the flow conduit of the single-piece chassis;

a plurality of electromagnetic coils configured to generate a flux into process fluid flowing through the flow conduit;

a pair of electrodes configured to electrically couple to the process fluid; and a feedthrough assembly configured to maintain a pressure of the process fluid while allowing a plurality of electrical conductors to pass therethrough, wherein the feedthrough assembly is disposed in and seals the single aperture.

2. The wafer-type electromagnetic flow sensor of claim 1, wherein the single-piece chassis is cast as a single piece of carbon steel.

3. The wafer-type electromagnetic flow sensor of claim 1, wherein each feature is a groove configured to receive the metal sealing ring.

4. The wafer-type electromagnetic flow sensor of claim 3, wherein each of the grooves includes pair of tapered sides and a flat bottom.

5. The wafer-type electromagnetic flow sensor of claim 1, wherein the plurality of electromagnetic coils is embedded within the non-conductive liner.

6. The wafer-type electromagnetic flow sensor of claim 1, wherein the pair of electrodes is embedded within the liner.

7. The wafer-type electromagnetic flow sensor of claim 1, wherein the non-conductive liner is formed as a molded body.

8. The wafer-type electromagnetic flow sensor of claim 7, wherein the non-conductive liner is formed of plastic.

9. The wafer-type electromagnetic flow sensor of claim 7, wherein the non-conductive liner is formed of polyurethane.

10. The wafer-type electromagnetic flow sensor of claim 7, wherein the non-conductive liner is formed of Adiprene.

11. The wafer-style electromagnetic flow sensor of claim 1, wherein the single aperture meets the flow conduit at substantially right angles.

12. The wafer-type electromagnetic flow sensor of claim 1, wherein the feedthrough assembly includes a glassed header.

13. The wafer-type electromagnetic flow sensor of claim 1, wherein the single piece chassis includes a dovetail channel in each face to engage the non-conductive liner.

14. The wafer-type electromagnetic flow sensor of claim 1, wherein the electromagnetic flow sensor is mounted between a pair of pipe flanges with such that the metallic sealing ring engages the feature of each face.

15. The wafer-type electromagnetic flow sensor of claim 1, wherein the electromagnetic flow sensor is coupled to a process variable transmitter.

16. The wafer-type electromagnetic flow sensor of claim 1, wherein each electrode is coupled to the feedthrough assembly via a tortuous path.

17. The wafer-type electromagnetic flow sensor of claim 1, and further comprising an electrical steel ring embedded within the non-conductive liner and disposed to direct flux from the plurality of coils into the flow conduit.

* * * * *